Feb. 5, 1924.
W. J. BRUNSMAN
AUTOMOBILE CURTAIN
Filed Jan. 3, 1921
1,482,458
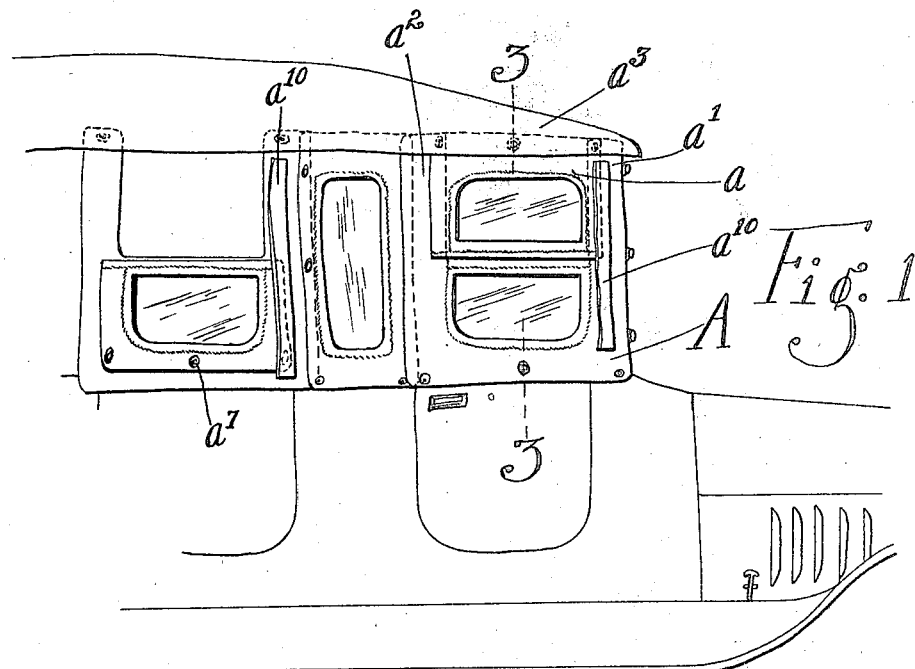
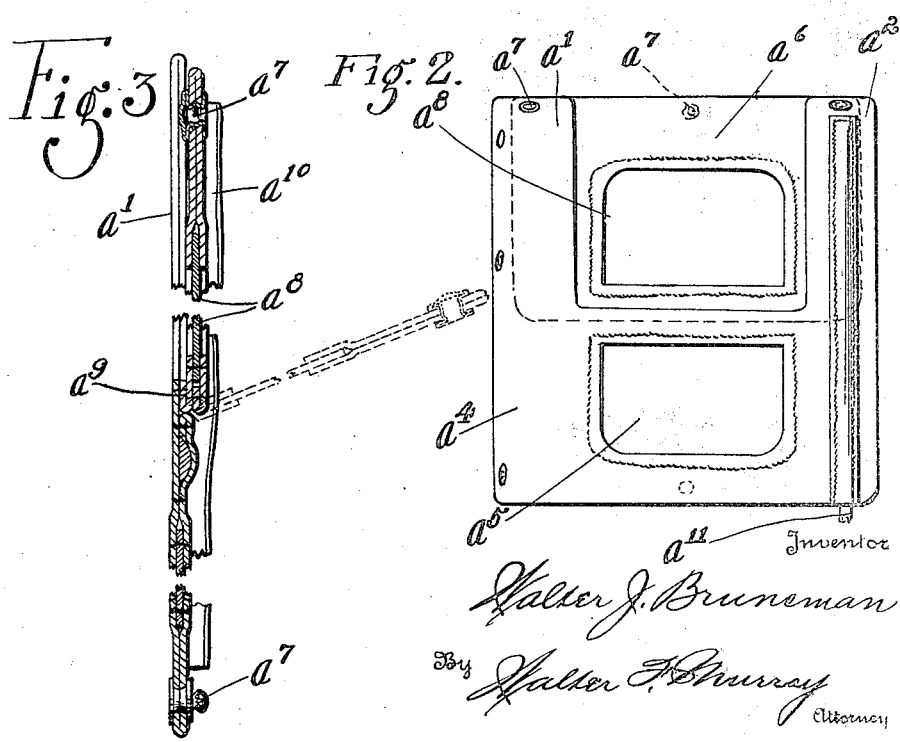

Patented Feb. 5, 1924.

1,482,458

UNITED STATES PATENT OFFICE.

WALTER J. BRUNSMAN, OF CINCINNATI, OHIO.

AUTOMOBILE CURTAIN.

Application filed January 3, 1921. Serial No. 434,465.

*To all whom it may concern:*

Be it known that I, WALTER J. BRUNSMAN, a citizen of the United States of America and resident of Cincinnati, in the county of Hamilton and State of Ohio, have invented new and useful Improvements in an Automobile Curtain, of which the following is a specification.

An object of my invention is to produce a simple and efficient means whereby ventilation may be provided for automobiles and other vehicles having removable storm curtains or winter curtains, without detaching or removing any of such curtains from the vehicle.

Another object is to provide a curtain of the type and kind referred to and for the purpose stated that will permit the maximum of light to enter the vehicle regardless of whether or not advantage is being taken of the ventilating feature thereof.

These and other objects are attained by the means described herein and disclosed in the accompanying drawing in which:—

Fig. 1 is a fragmental side elevation of an automobile having mounted thereon devices embodying my invention.

Fig. 2 is an enlarged side elevation of a curtain as seen from the interior of a vehicle.

Fig. 3 is a sectional view on line 3—3 of Fig. 1.

My invention comprises a curtain A adapted to be removably mounted upon a vehicle such as an automobile and having hingedly mounted thereon a relatively movable flap $a$. The curtain A is ordinarily made of a flexible waterproofed material such as treated leather, rubberized fabric, etc., and is preferably made with two upwardly extending stay strips $a'$ and $a^2$ that may be secured upon the top $a^3$ of the automobile by any suitable means commonly employed in the art for removably mounting curtains on vehicles. If desired, the stay strips may be supported upon suitable standards such as $a^{11}$ commonly used in the art. The stay strips are preferably integral with the body portion $a^4$ forming the lower part of the curtain. The body of the curtain may be removably mounted on the automobile by any suitable means commonly employed in the art. The transparency $a^5$ is mounted within the body portion of the curtain. The stay strips $a'$ and $a^2$ are spaced from one another and extend from the upper edge of the body $a^4$ in alignment with the sides of the body $a^4$, thereby providing an opening $a^6$ intermediate the stay strips, the body section of the curtain and the top $a^3$ of the automobile when the curtain is mounted upon such vehicle. The stay strips as shown in the accompanying drawings extend in parallelism from the body, but are not necessarily limited to such construction. The flap $a$ is hingedly mounted upon the body $a^4$ of the curtain adjacent the upper end of such body, and is adapted to be moved about such hinge to either extend upward so as to close the opening between the stay strips, the body, and the top of the automobile, or to assume a position over and upon the body section of the curtain. The flap $a$ is preferably mounted upon the outer or exposed side of the curtain. Suitable means such as the glove fasteners $a^7$, may be employed to secure the flap $a$ over and upon the body $a^4$ when it is desired that the flap be retained in such position so as to afford ventilation of the vehicle. When the flap is to be employed to close the opening $a^6$ it may be held in position as a closure by suitable fastening devices such as $a^7$, the same being any of the fastening devices commonly employed in the art for removably mounting such curtain upon automobiles. A suitable transparency $a^8$ may be mounted upon the flap in such position that it will register with the opening $a^6$ and with the transparency $a^5$ in the body $a^4$ depending on the position of the flap $a$. The hinge $a^9$ whereby the flap is secured upon the body may be constructed in any manner, and to provide as simple a device as possible, it is preferable to attach the flap to the body by sewing the flap, which is preferably flexible such as leather, etc., upon the body $a^4$. The flap may be an integral part of the curtain body $a^4$ if desired. A protector strip $a^{10}$ is preferably mounted upon the forward ends of the body $a^4$ and of the stay strip $a'$ by being sewed thereto, such protector strip being preferably of the same material as the curtain and the flap, and being adapted to extend over the forward end of the flap in either of its positions. The protector strip prevents fluttering of the flap that might be occasioned by the air or wind encountered by the movement of the automobile, and also prevents a draft between the forward end of the flap *a* and the stay strip *a'* when the flap is in its raised position.

What I claim is:—

1. A curtain for vehicles having a top and comprising a body portion adapted to be secured upon the vehicle, a transparency mounted upon the body of the curtain, stay strips extending from the body and each being adapted to extend to the top of the vehicle whereby an opening is provided between the stay strips, the body of the curtain, and the top of the vehicle, a flap hingedly mounted on the curtain adapted in one position to be secured over the opening, and in a second position being adapted to be secured upon the curtain so as to leave the opening unobstructed, a transparency mounted upon the flap and adapted in the first position of the flap to register with the opening, and in the second position of the flap to register with the transparency upon the body, and a protector strip mounted on the curtain and extending over the end of the flap.

2. A curtain for vehicles having a top and comprising a body portion adapted to be secured upon the vehicle, stay strips extending from the body and each being adapted to extend to the top of the vehicle whereby an opening is provided between the stay strips, the top of the curtain and the body of the vehicle, a flap hingedly mounted on the curtain adapted to be turned upon itself and to be secured in one position over the opening and to be secured in a second position upon the curtain body so as to leave the opening unobstructed, and a protective strip mounted on the curtain and adapted to extend over the end of the flap in both positions.

In testimony whereof, I have hereunto subscribed my name this 27th day of December, 1920.

WALTER J. BRUNSMAN.